US012606403B2

(12) United States Patent (10) Patent No.: US 12,606,403 B2
Ogawa et al. (45) Date of Patent: Apr. 21, 2026

(54) CONVEYANCE DEVICE THAT CONVEYS SHEETS WITH DIFFERENT SPECIFICATIONS

(71) Applicant: KYOCERA Document Solutions Inc., Osaka (JP)

(72) Inventors: Shikitaro Ogawa, Osaka (JP); Yoshitaka Tokoro, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 47 days.

(21) Appl. No.: 18/638,852

(22) Filed: Apr. 18, 2024

(65) Prior Publication Data

US 2024/0359938 A1 Oct. 31, 2024

(30) Foreign Application Priority Data

Apr. 28, 2023 (JP) ................................. 2023-074246

(51) Int. Cl.
B65H 29/60 (2006.01)
H04N 1/00 (2006.01)
(52) U.S. Cl.
CPC ......... B65H 29/60 (2013.01); H04N 1/00541 (2013.01); B65H 2402/441 (2013.01); B65H 2801/39 (2013.01)
(58) Field of Classification Search
CPC ............ B65H 29/60; B65H 2301/3114; B65H 2301/312; B65H 2301/3124; B65H 2301/4455; B65H 2301/44552; B65H 2301/448; B65H 2402/441; B65H 2601/321; B65H 2601/324; H04N 1/00612; H04N 1/00538–00551; H04N 1/0058; H04N 1/00588; H04N 1/00591; H04N 1/00594; H04N 1/00596; G03G 21/1623; G03G 21/1628; G03G 21/1633; G03G 21/1638; G03G 21/1647; G03G 21/169;

(Continued)

(56) References Cited

U.S. PATENT DOCUMENTS 7,202,983 B2 * 4/2007 Yokota ................... H04N 1/203
358/408
7,379,700 B2 * 5/2008 Iwata ................... H04N 1/0058
399/125

(Continued)

FOREIGN PATENT DOCUMENTS

JP 2000026003 A 1/2000

*Primary Examiner* — Ernesto A Suarez
(74) *Attorney, Agent, or Firm* — IP Business Solutions, LLC.

(57) ABSTRACT

A conveyance device includes a supply tray, a body, a linear conveyance path, a folded conveyance path, and a straight path discharge portion. The supply tray supplies a sheet. The sheet is supplied to the body from the supply tray. The linear conveyance path is provided in the supply tray and the body. The folded conveyance path branches to one side from the linear conveyance path. The straight path discharge portion branches to the other side from the linear conveyance path and conveys and discharges the sheet from the linear conveyance path through a straight path. The straight path discharge portion includes a conveyance guide that guides movement of the sheet conveyed by the straight path discharge portion. The conveyance guide is detachable from the body.

5 Claims, 8 Drawing Sheets

(58) Field of Classification Search
CPC ......... G03G 2215/00202; G03G 15/60; G03G
15/602
See application file for complete search history.

(56) References Cited

U.S. PATENT DOCUMENTS

| | | | | |
|---|---|---|---|---|
| 8,587,848 | B2 * | 11/2013 | Nose .................. | H04N 1/00602 |
| | | | | 358/496 |
| 8,781,365 | B2 * | 7/2014 | Inoue .................... | G03G 15/60 |
| | | | | 399/125 |
| 11,252,294 | B2 * | 2/2022 | Nakagawa ............... | B65H 5/36 |
| 11,390,481 | B2 * | 7/2022 | Kawasaki .............. | B65H 31/20 |
| 2023/0382674 | A1 * | 11/2023 | Tokoro .................... | B65H 5/26 |

* cited by examiner

CONVEYANCE DEVICE THAT CONVEYS SHEETS WITH DIFFERENT SPECIFICATIONS

INCORPORATION BY REFERENCE

This application claims priority to Japanese Patent Application No. 2023-074246 filed on Apr. 28, 2023, the entire contents of which are incorporated by reference herein.

BACKGROUND

The disclosure relates to a conveyance device.

A conveyance device capable of automatically conveying sheets for reading images of the sheets has been proposed. The conveyance device folds and conveys the sheets while bending the sheets and reads the images of the sheets. For example, a conveyance device that can select to convey a sheet linearly without bending the sheet, that is, through a straight path at the time of conveying a hard sheet such as a business card or postcard is known.

SUMMARY

As one aspect of the disclosure, a technique that is further improved from the above technique is proposed.

A conveyance device according to one aspect of the disclosure includes a supply tray, a body, a linear conveyance path, a folded conveyance path, and a straight path discharge portion. The supply tray supplies a sheet. The sheet is supplied to the body from the supply tray. The linear conveyance path is provided in the supply tray and the body. The folded conveyance path branches to one side from the linear conveyance path. The straight path discharge portion branches to the other side from the linear conveyance path and conveys and discharges the sheet from the linear conveyance path through a straight path. The straight path discharge portion includes a conveyance guide that guides movement of the sheet conveyed by the straight path discharge portion. The conveyance guide is detachable from the body.

DETAILED DESCRIPTION

Figure 1:
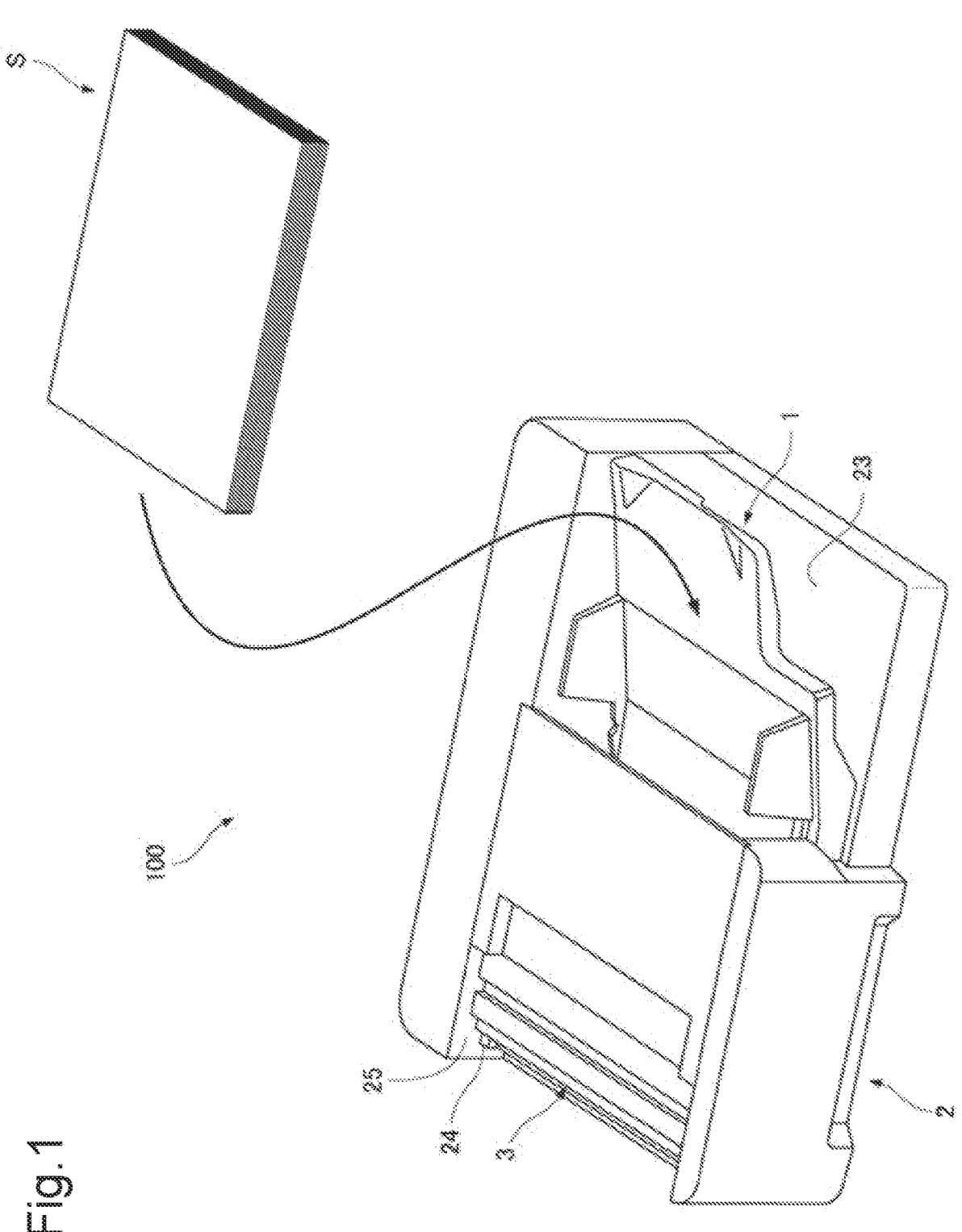
FIG. 1 is a diagram showing the appearance of a conveyance device according to an embodiment of the disclosure.

Hereinafter, a conveyance device 100 according to an embodiment of the disclosure will be described with reference to the drawings. In addition, the same reference numerals are given to the same or corresponding parts in the drawings, and the description thereof will not be repeated.

First, the appearance of the conveyance device 100 will be described with reference to FIG. 1. FIG. 1 is a diagram showing the appearance of the conveyance device 100.

Referring to FIG. 1, the conveyance device 100 includes a supply tray 1, a body 2, and a straight path discharge portion 3.

The supply tray 1 supplies sheets S to the body 2. The straight path discharge portion 3 conveys the sheets S from the supply tray 1 and the body 2 through a straight path and discharges them to the outside of the device.

Figure 2:
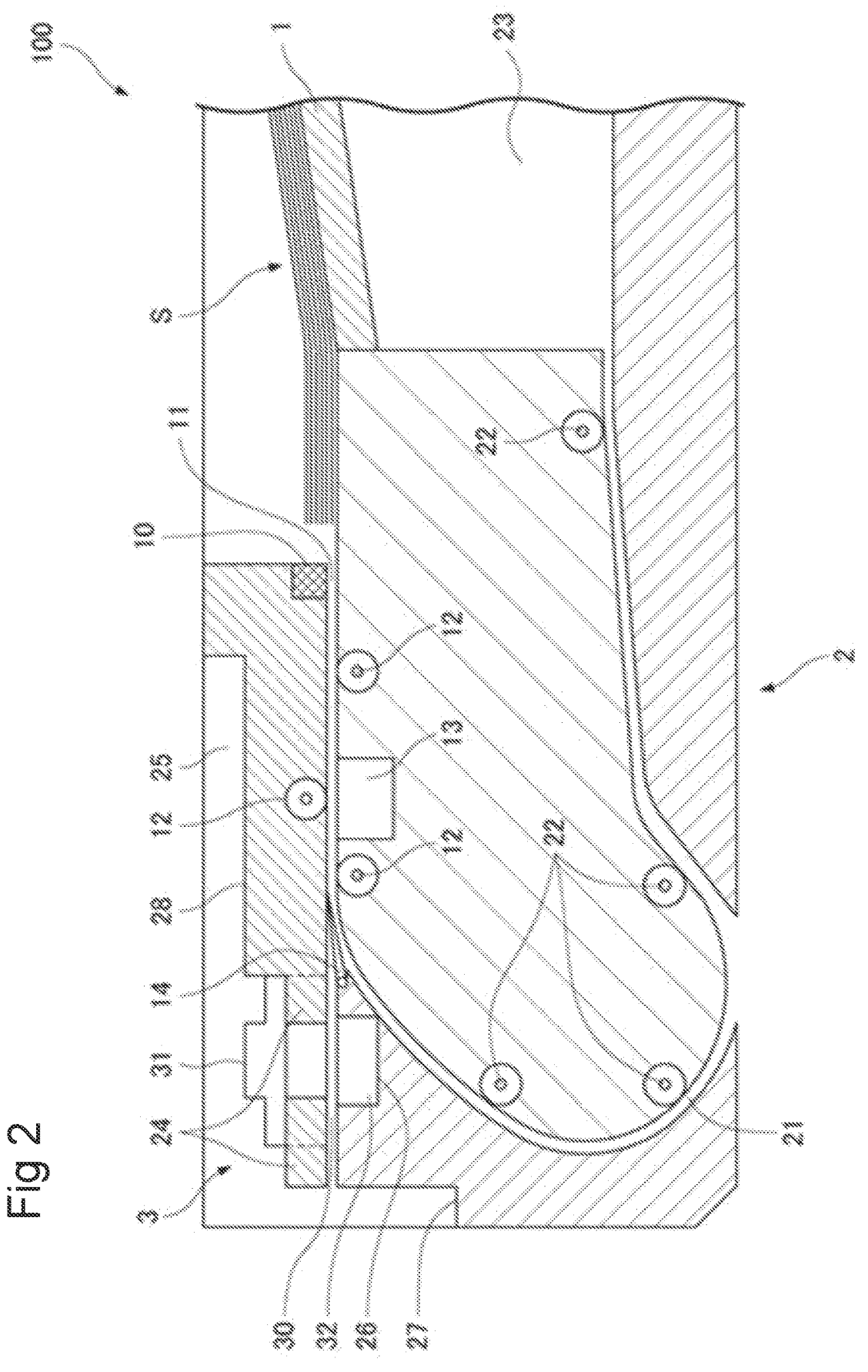
FIG. 2 is a longitudinal sectional view of the conveyance device.

Next, a configuration of the conveyance device 100 will be described with reference to FIG. 2. FIG. 2 is a longitudinal sectional view of the conveyance device 100.

Referring to FIG. 2, the body 2 includes a linear conveyance path 11 and a folded conveyance path 21. The linear conveyance path 11 conveys the sheets S linearly. The folded conveyance path 21 branches off from the linear conveyance path 11 and conveys the sheets S by folding them back. In addition to the folded conveyance path 21, a straight path conveyance path 30 that branches off from the linear conveyance path 11 as a continuation thereof is provided in the straight path discharge portion 3.

The straight path discharge portion 3 includes a conveyance guide 31 at a position corresponding to the straight path conveyance path 30. The conveyance guide 31 guides the movement of the sheets S at the time of conveying the sheets S through the straight path conveyance path 30 and discharging the sheets S. The conveyance guide 31 is fitted to and supported by the body 2.

The conveyance guide 31 is attached to and supported by the body 2 by being fitted to the body 2, and is removed from the body 2 by being unfitted. That is, the conveyance guide 31 is detachable from the body 2. A plurality of types of conveyance guides 31 are prepared in advance. For example, the conveyance guide 31 includes a standard conveyance guide 31 with specifications including a height suitable for transporting plain paper having a standard thickness, and other conveyance guides 31 with different specifications such as a changed height in order to convey the sheets S thicker than the standard thickness. By replacing the standard conveyance guide 31 with the other conveyance guides 31 described above, the conveyance device 100 can convey the thick sheets S.

Thus, a user can replace the conveyance guide 31 in accordance with the specifications of the sheet S. As a result, it is possible to perform conveyance by an appropriate straight path in accordance with the specifications of the sheet S, such as the thickness of the sheet S.

The straight path discharge portion 3 may be configured to include a locking mechanism (not shown) or the like for preventing the conveyance guide 31 from being removed pointlessly.

The conveyance device 100 will be further described below with reference to FIG. 2. Hereinafter, an upstream side and a downstream side in the conveyance of the sheet S will be simply referred to as an "upstream side" and a "downstream side", respectively.

The body 2 further includes a separation supply portion 10, a linear path conveyance roller group 12, a first image reading portion 13, a folded path conveyance roller group 22, a branching guide portion 14, a fitting support portion 24, and a discharge portion 23.

The separation supply portion 10 is provided at an upstream end of the linear conveyance path 11. The separation supply portion 10 separates the sheets S one by one from the bundle of sheets S disposed on the supply tray 1 and supplies the separated sheets to the downstream side.

The linear path conveyance roller group 12 is a roller group provided on the linear conveyance path 11. The linear path conveyance roller group 12 is rotationally driven to convey the sheets S through the linear conveyance path 11.

The first image reading portion 13 is located below the linear conveyance path 11 on the upstream side of the branching guide portion 14. The first image reading portion 13 reads one side of the sheet S.

The folded path conveyance roller group 22 is a roller group provided on the folded conveyance path 21. The folded path conveyance roller group 22 is rotationally driven to convey the sheet S through the folded conveyance path 21.

The lower side of the folded conveyance path 21 is partially exposed from the body 2. The partially exposed portion of the folded conveyance path 21 faces a contact glass of a separate image reading device (not shown). When the sheet S being conveyed to the folded conveyance path 21 passes through a partially exposed lower end of the folded conveyance path 21, the other side is read by the separate image reading device.

The branching guide portion 14 is provided at a portion where the linear conveyance path 11 branches into the folded conveyance path 21 and the straight path conveyance path 30. The branching guide portion 14 is a band-shaped plate member whose tip end has a wedge-shaped longitudinal section. The branching guide portion 14 is supported by the body 2 so as to be rotatable, and receives the sheet S at its wedge-shaped tip end.

The branching guide portion 14 is rotated to take either a posture in which the sheet S conveyed from the linear conveyance path 11 on the upstream side of the branching guide portion 14 is guided as it is to the straight path discharge portion 3 on the downstream side or a posture in which the sheet S is branched to the folded conveyance path 21 and guided.

The branching guide portion 14 closes the folded conveyance path 21 when the branching guide portion 14 is in the posture of guiding the sheet S to the straight path discharge portion 3 on the downstream side. Further, the branching guide portion 14 closes the linear conveyance path 11 when the branching guide portion 14 is in the posture of guiding the sheet S to the folded conveyance path 21.

The body 2 has both end portions spaced apart from each other in a direction orthogonal to a feeding direction of the sheet S in the portion of the straight path conveyance path 30. Each of the both end portions has an inner surface 25.

The fitting support portions 24 are a pair of convex portions provided on the respective inner side surfaces 25 to protrude in the width direction of the straight path conveyance path 30 toward the center of the straight path conveyance path 30. The fitting support portion 24 is fitted to the conveyance guide 31 of the straight path discharge portion 3 and supports the conveyance guide 31.

The discharge portion 23 discharges the sheet S conveyed through the folded conveyance path 21.

Figure 3:
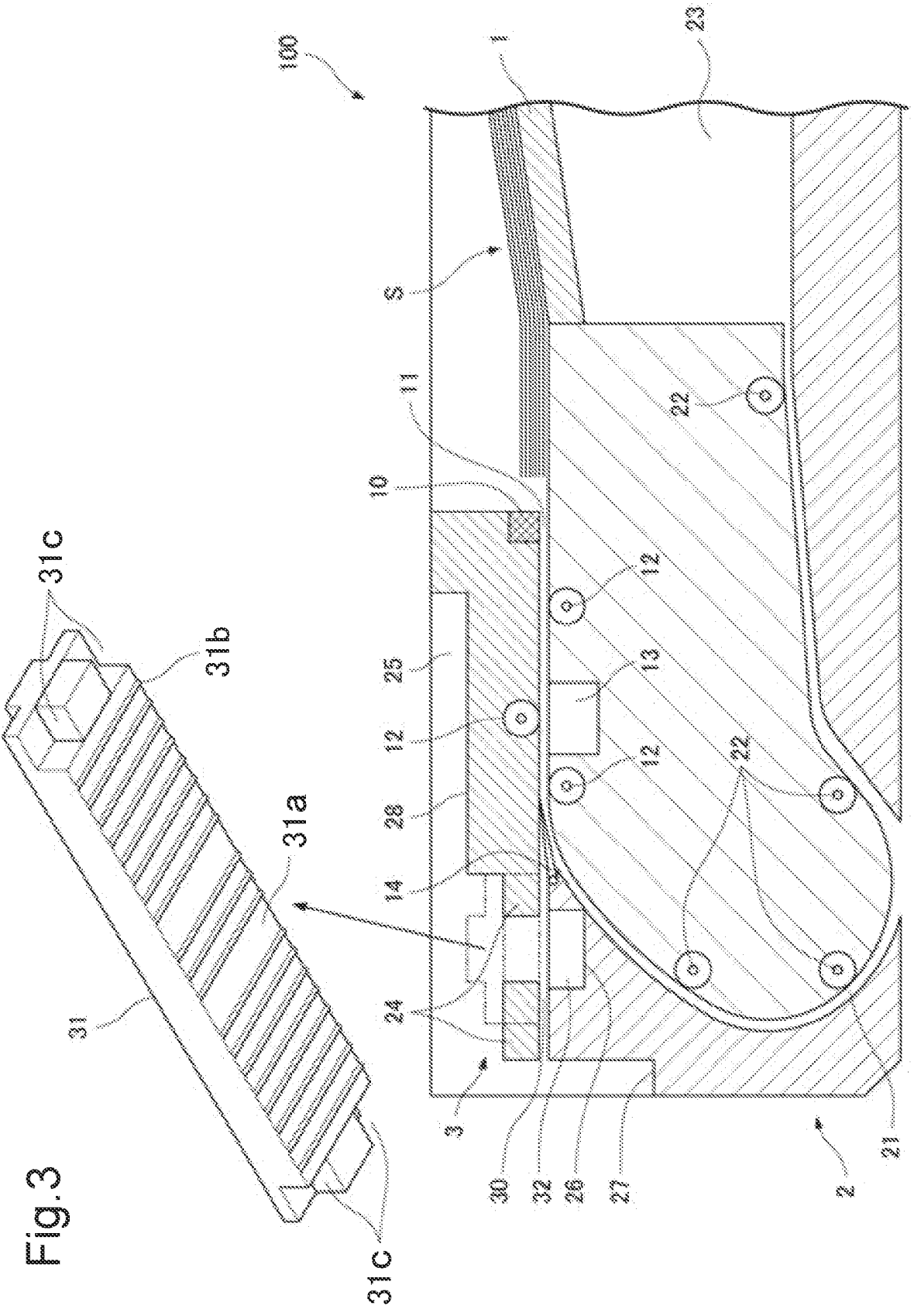
FIG. 3 is a longitudinal sectional view of the conveyance device with a conveyance guide removed.

Next, the conveyance guide 31 will be described with reference to FIG. 3 in addition to FIG. 2. FIG. 3 is a longitudinal sectional view of the conveyance device 100 and shows a state in which the conveyance guide 31 is removed.

The conveyance guide 31 has a guide surface 31a facing the sheet S conveyed through the straight path conveyance path 30, a plurality of protrusions 31b provided on the guide surface 31a in the conveyance direction of the straight path conveyance path 30, and fitted portions 31c respectively provided at both ends of the conveyance guide 31 in the width direction of the straight path conveyance path 30.

In this embodiment, the fitted portions 31c are a pair of concave portions respectively provided at both ends of the conveyance guide 31. The pair of concave portions are fitted to the pair of convex portions in the fitting support portion 24 provided in the body 2. That is, the fitted portions 31c are fitted to the fitting support portions 24. Thereby, the conveyance guide 31 is supported by the fitting support portions 24.

When the fitted portions 31c are fitted to the fitting support portions 24, the guide surface 31a and the body 2 form the straight path conveyance path 30 with a predetermined gap therebetween. The straight path conveyance path 30 conveys the sheet S through a straight path and discharges it to the outside of the device. The conveyance guide 31 is replaced by making the heights of the conveyance guides 31 different from each other, and thus the height of the gap forming the straight path conveyance path 30 can be changed in accordance with the thickness of the sheet S.

The conveyance guide 31 can be attached to the body 2 by the fitted portion 31c and the fitting support portion 24 of the body 2 being fitted together, and can be easily removed from the body 2 by releasing of the fitting between the fitted portion 31c and the fitting support portion 24.

The protrusions 31b are provided to extend in a direction in which the sheet S is conveyed. The plurality of protrusions 31b are provided on the guide surface 31a and guide the sheet S smoothly by preventing the conveyance guide 31 from coming into surface-contact with the sheet S.

With the above-described configuration, the sheet S supplied from the supply tray 1 is conveyed to the linear conveyance path 11 and branched by the branching guide portion 14. The sheet S guided to the straight path discharge portion 3 is discharged to the outside of the device through the straight path discharge portion 3. On the other hand, the sheet S guided to the folded conveyance path 21 is discharged to the discharge portion 23 through the folded conveyance path 21.

Figure 4:
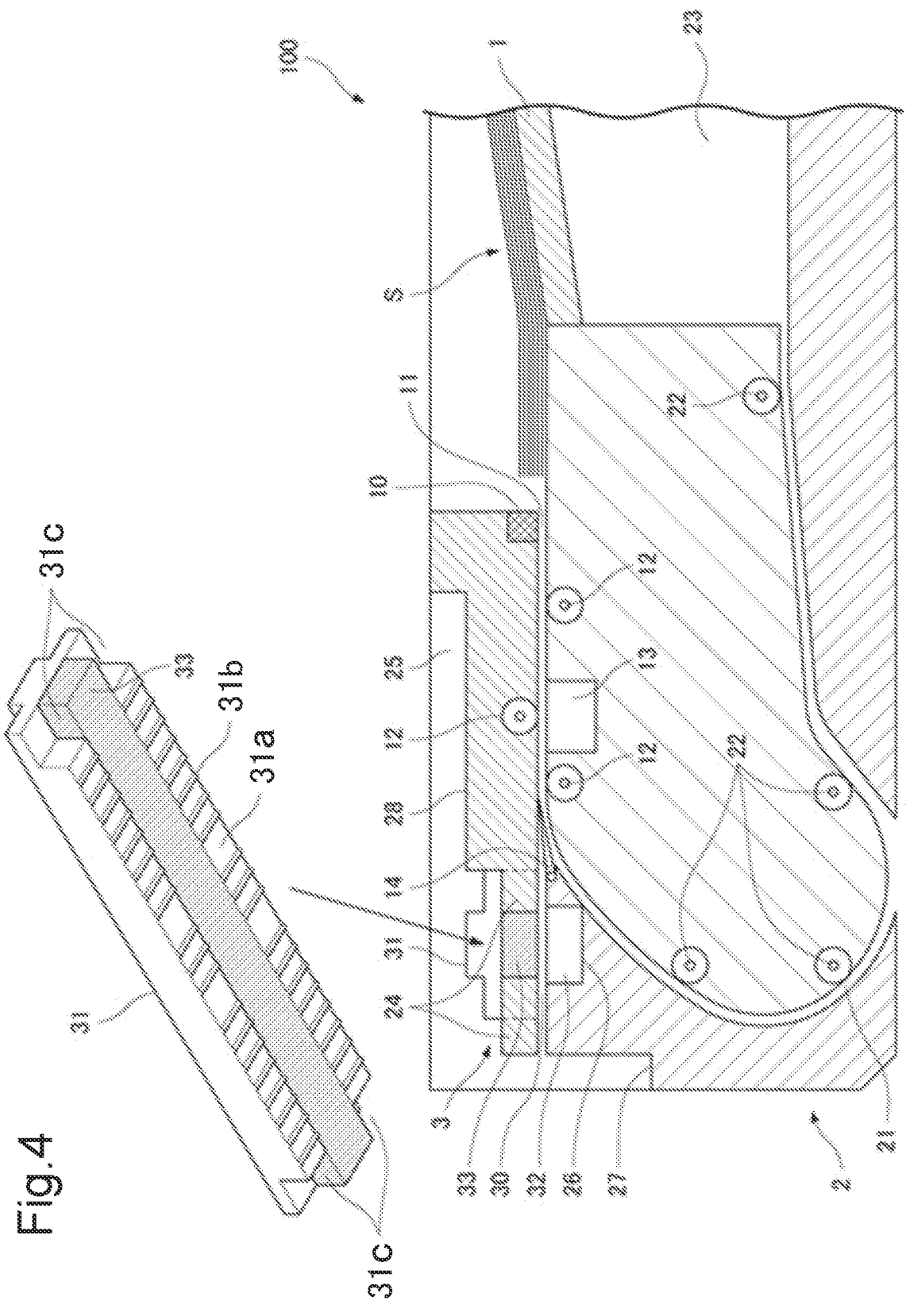
FIG. 4 is a longitudinal sectional view of the conveyance device with the conveyance guide replaced.

Next, an example in which the conveyance guide 31 is replaced in accordance with the specifications of the sheet S will be described with reference to FIG. 4. FIG. 4 is a longitudinal sectional view of the conveyance device 100 with the conveyance guide 31 replaced.

Referring to FIG. 4, the body 2 includes the first image reading portion 13 that reads one side of the sheet S as in the previous example. The conveyance guide 31 includes a second image reading portion 33 that reads the other side of the sheet S. That is, the second image reading portion 33 is provided as a part of the conveyance guide 31 and is detachable from the body 2.

As described above, the first image reading portion 13 is located below the linear conveyance path 11 on the upstream side of the branching guide portion 14. Thus, even when the sheet S is not read by a separate image reading device, one side of the sheet S is read by the first image reading portion 13.

The second image reading portion 33 is disposed in the longitudinal direction of the conveyance guide 31 at the center of the conveyance guide 31 in the width direction (the feeding direction of S). That is, the second image reading portion 33 is located above the straight path conveyance path 30. The second image reading portion 33 is disposed such that a sensor surface of the second image reading portion 33 and the guide surface 31a of the conveyance guide 31 are flush with each other.

The second image reading portion 33 is typically a contact image sensor (CIS). The CIS is an image sensor in which a sensor (light receiving element), a light source (LED), and a lens are integrally formed. Further, the first image reading portion 13 is a CIS, and the above-described separate image reading device is typically a CIS or a charged coupled device (CCD) sensor.

With the above-described configuration, the first image reading portion 13 reads an image on one side of the sheet S being conveyed through the linear conveyance path 11. Then, the second image reading portion 33 reads an image on the other side of the sheet S being conveyed by the straight path discharge portion 3.

Thus, for a sheet S having images on both sides thereof, the images on both sides can be read through one conveyance. As a result, even when the specifications of the sheet S are changed and images are formed on both sides of the sheet S, straight path conveyance can be performed.

Figure 5:
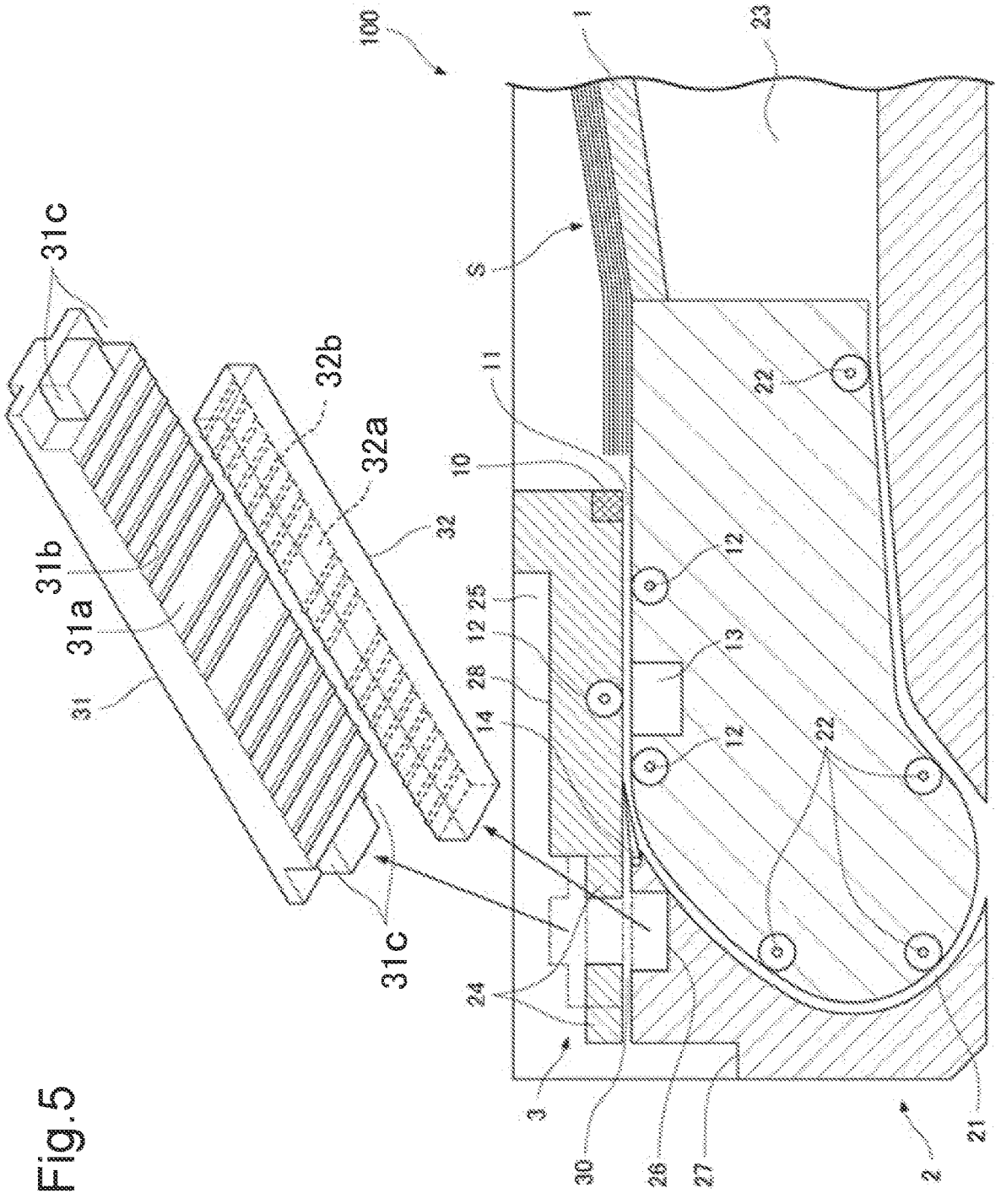
FIG. 5 is a longitudinal sectional view of the conveyance device with the conveyance guide and a counter conveyance guide removed.

Next, a configuration of a counter conveyance guide 32 disposed to face the conveyance guide 31 will be described with reference to FIG. 5. FIG. 5 is a longitudinal sectional view of the conveyance device 100 and shows a state in which the conveyance guide 31 and the counter conveyance guide 32 are removed.

Referring to FIG. 5, the straight path discharge portion 3 further includes the counter conveyance guide 32 disposed to face the conveyance guide 31 with the sheet S interposed therebetween.

The counter conveyance guide 32 has a guide surface 32a that faces the sheet S, and a plurality of protrusions 32b disposed on the guide surface 32a in a direction in which the sheet S is conveyed.

The body 2 has a fitting groove portion 26 into which the counter conveyance guide 32 is fitted. The fitting groove portion 26 is provided in the body 2 similarly to the fitting support portion 24. The fitting groove portion 26 is a concave portion provided in the body 2 in the portion of the straight path conveyance path 30 with the width direction of the sheet S as the longitudinal direction.

The counter conveyance guide 32 can be attached to the body 2 by both lengthwise ends thereof being inserted into the fitting groove portion 26, and can be easily removed from the body 2 by releasing of the fitting between the counter conveyance guide 32 and the fitting groove portion 26. That is, the counter conveyance guide 32 is detachable from the body 2.

Thus, the conveyance device 100 can be replaced with an appropriate counter conveyance guide 32 in accordance with the specifications of the sheet S. As a result, the conveyance device 100 can perform appropriate straight path conveyance in accordance with the specifications of the sheet S.

Figure 6:
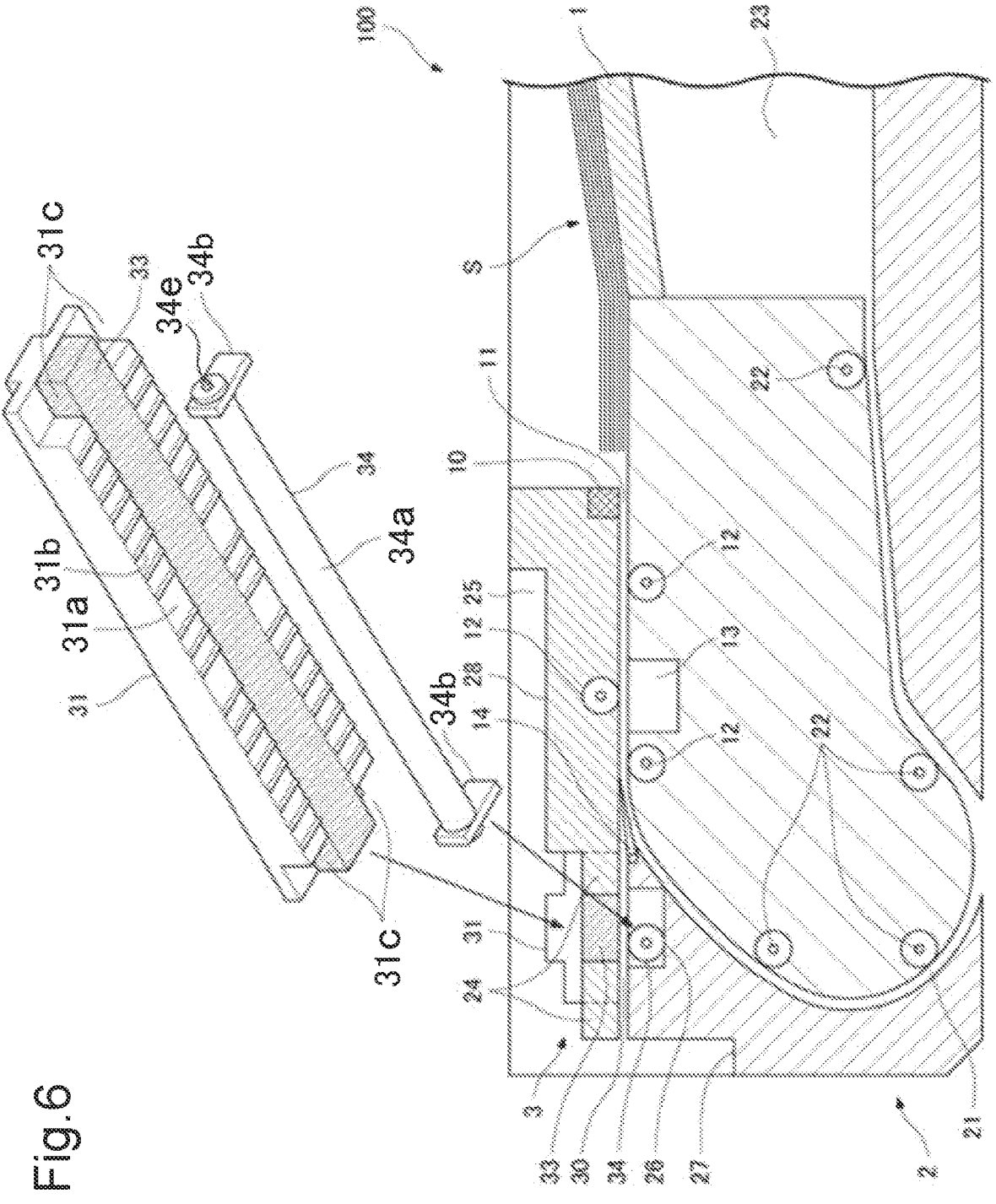
FIG. 6 is a longitudinal sectional view of the conveyance device with the conveyance guide and the counter conveyance guide replaced.

Specifically, a state in which the counter conveyance guide 32 has been replaced will be described with reference to FIG. 6. FIG. 6 is a longitudinal sectional view of the conveyance device 100 and shows a state in which the counter conveyance guide 32 in FIG. 5 has been replaced with the counter conveyance guide 34 together with the conveyance guide 31.

Referring to FIG. 6, the counter conveyance guide 34 includes a roller 34a and roller support portions 34b disposed at both ends of the roller 34a. The roller support portions 34b rotatably supports the roller 34a. The roller support portions 34b are inserted and fitted into the fitting groove portion 26. The roller 34a rotates in the conveyance direction of the sheet S so that its circumferential surface comes into contact with the sheet S conveyed through the straight path discharge portion 3 around a rotating shaft 34e extending in a direction orthogonal to the conveyance direction of the sheet S (the width direction of the sheet S). Since the counter conveyance guide 34 has a roller structure, the sheet S rolls into contact with the counter conveyance guide 34, and thus the sheet S can be smoothly conveyed through a straight path, for example, even when the sheet S has a large weight.

Figure 7:
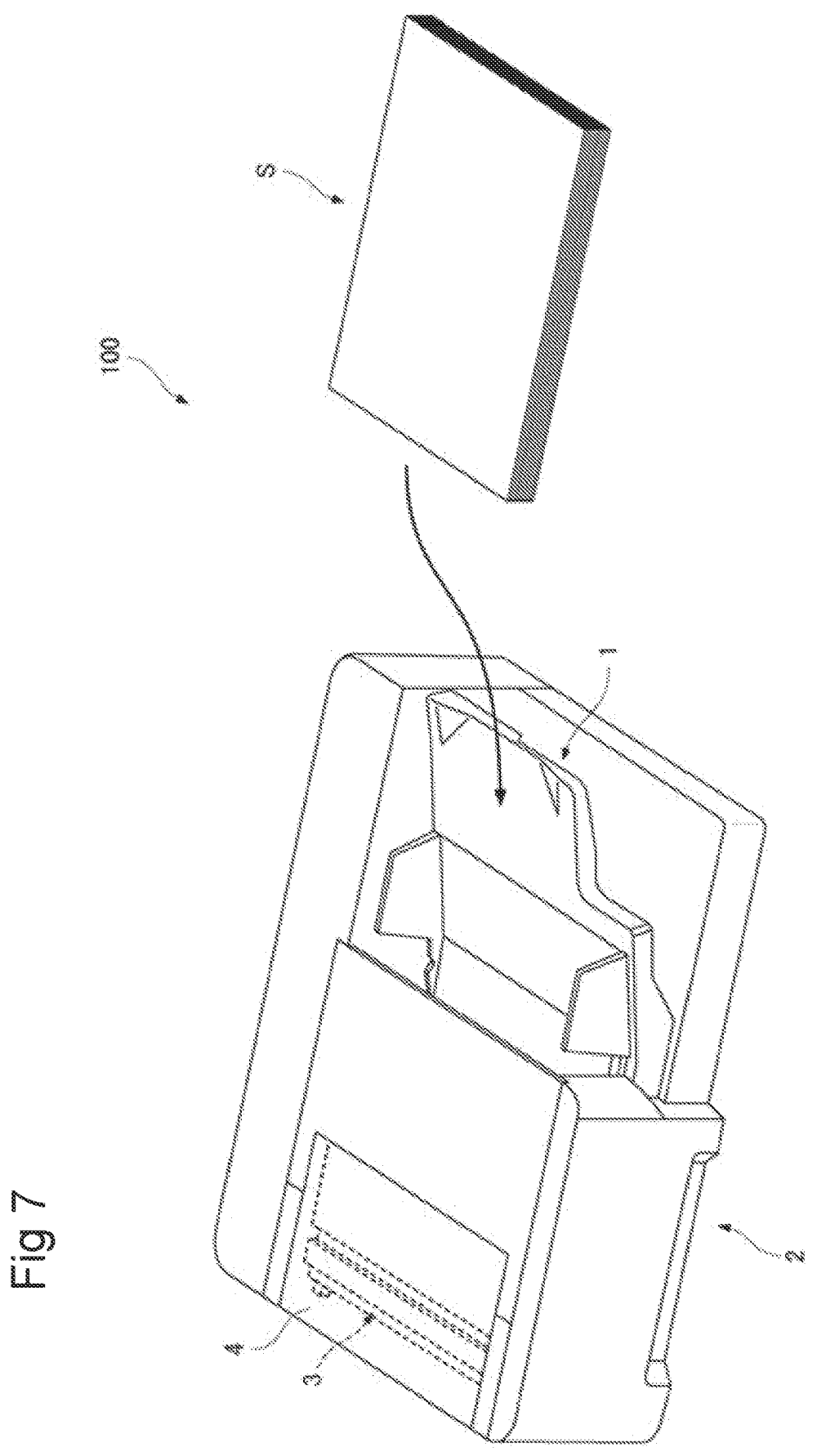
FIG. 7 is a diagram showing the appearance of the conveyance device with a cover attached thereto.

Next, a configuration of a cover 4 that covers the straight path discharge portion 3 will be described with reference to FIG. 7. FIG. 7 is a diagram showing the appearance of the conveyance device 100 with the cover 4 attached thereto.

Referring to FIG. 7, the body 2 includes the cover 4 that covers the straight path discharge portion 3.

Figure 8:
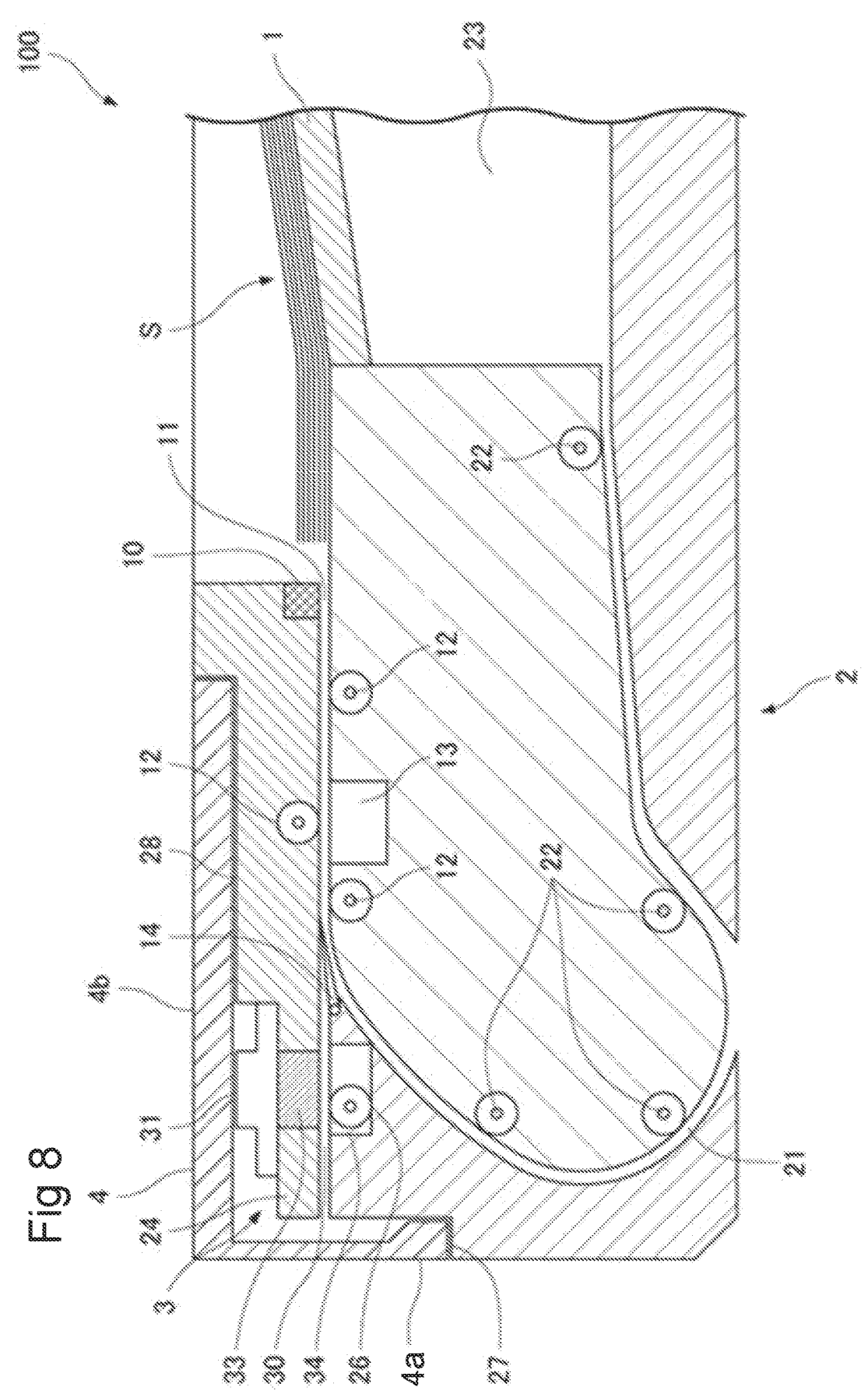
FIG. 8 is a longitudinal sectional view of the conveyance device with the cover attached thereto.

Next, a configuration of the conveyance device 100 with the cover 4 attached thereto will be described with reference to FIG. 8. FIG. 8 is a longitudinal sectional view of the conveyance device 100 with the cover 4 attached thereto.

Referring to FIG. 8, the cover 4 is a plate member with an L-shaped cross-section, and includes a front plate portion 4a that covers the front surface of the straight path discharge portion 3, and an upper plate portion 4b that covers the upper surface of the straight path discharge portion 3.

The body 2 includes a positioning step portion 27 that abuts on and receives the lower end surface of the front plate portion 4a on the front surface of the straight path discharge portion 3, and a positioning step portion 28 that abuts on and receives the lower surface of the upper plate portion 4b.

That is, the cover 4 can be attached to the body 2 by the front plate portion 4a and the upper plate portion 4b abutting on the positioning step portions 27 and 28 of the body, and can be removed by cancelling the abutting. That is, the cover 4 is detachable from the body 2.

Thus, the user can attach and detach the straight path discharge portion 3 (the conveyance guide 31 and the like) by removing the cover 4. As a result, the user can easily replace the straight path discharge portion 3, and it is possible to achieve an improvement in maintenance of the conveyance device 100.

The cover 4 may be configured to be in an open state, for example, by providing a hinge between a lower portion of the front plate portion 4a and the positioning step portion 27 to rotate the cover 4.

In general conveyance devices, there are dimensional restrictions on a straight path conveyance path, and it is not possible to perform automatic conveyance of sheets with a large weight, such as plastic cards. However, according to the above-described embodiment, even when the specifications of a sheet are changed, the sheet can be conveyed through a straight path in accordance with the specifications of the sheet by mounting the conveyance guide 31 according to the specifications of the sheet.

The embodiment of the disclosure has been described above with reference to the drawings. However, the disclosure is not limited to the above-described embodiment, and can be implemented in various forms without departing from the spirit thereof. For ease of understanding, the drawings mainly show components schematically, and the thicknesses, lengths, numbers, intervals, and the like of the components shown in the diagram may differ from the actual ones due to the circumstances of drawing. Further, the materials, shapes, dimensions, and the like of the components shown in the above-described embodiment are merely examples and are not particularly limited, and various changes can be made without substantially departing from the configuration of the disclosure.

What is claimed is:

1. A conveyance device comprising:

a supply tray that supplies a sheet;

a body to which the sheet is supplied from the supply tray;

a linear conveyance path that is provided in the supply tray and the body;

a folded conveyance path that branches to one side from the linear conveyance path;

a first conveyance guide that is detachable from the body, and forms, when the first conveyance guide is attached to the body, a first straight path branching to other side from the linear conveyance path, with a predetermined first gap between the body and the first conveyance guide; and a second conveyance guide that is detachable from the body, and forms, when the second conveyance guide is attached to the body, a second straight path branching to other side from the linear conveyance path, with a predetermined second gap, having a different interval than the first gap, between the body and the second conveyance guide, wherein the first conveyance guide is changed to the second conveyance guide according to a thickness of the sheet.

2. The conveyance device according to claim 1, further includes a counter conveyance guide disposed to face the first conveyance guide or the second conveyance guide through the first straight path or the second straight path, and the counter conveyance guide is detachable from the body.

3. The conveyance device according to claim 2, wherein the counter conveyance guide includes a roller that rotates in a conveyance direction of the sheet so that its circumferential surface comes into contact with the sheet conveyed through the first straight path or the second straight path around a rotating shaft extending in a direction orthogonal to the conveyance direction.

4. The conveyance device according to claim 1, wherein the body further includes a cover that covers the first conveyance guide or the second conveyance guide, and the cover is detachable from the body.

5. A conveyance device comprising:

a supply tray that supplies a sheet;

a body to which the sheet is supplied from the supply tray and that includes a first image reading portion;

a linear conveyance path that is provided in the supply tray and the body;

a folded conveyance path that branches to one side from the linear conveyance path;

a first conveyance guide that is detachable from the body, includes a second image reading portion, and forms, when the first conveyance guide is attached to the body, a first straight path branching to other side from the linear conveyance path; and a second conveyance guide that is detachable from the body, does not include the second image reading portion, and forms, when the second conveyance guide is attached to the body, a second straight path branching to other side from the linear conveyance path, wherein the first image reading portion reads an image on one side of the sheet being conveyed through the linear conveyance path, the second image reading portion reads an image on the other side of the sheet being conveyed through the first straight path, and the first conveyance guide is attached to the body, in case that the sheet has images on both sides of the sheet, and the second conveyance guide is attached to the body, in case that the sheet has an image only on one side of the sheet.

* * * * *